Feb. 17, 1959  V. L. TILLI ET AL  2,873,759
FAULT-RESPONSIVE SECTIONALIZING VALVE ARRANGEMENT
Filed May 4, 1955
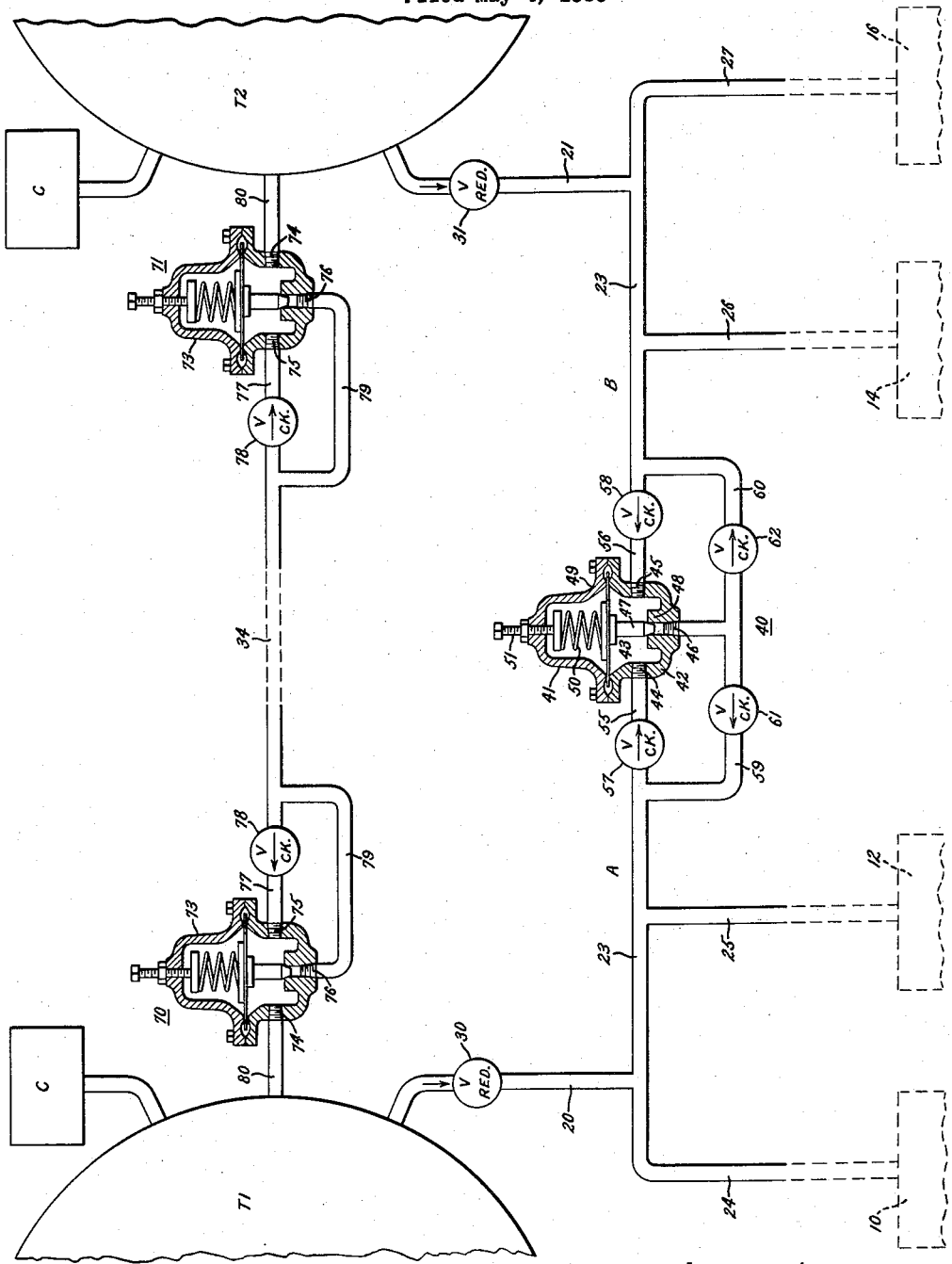
Inventors:
Vincent L. Tilli,
Arthur L. Bohlinger,
by J. Wesley Faulkner
Their Attorney.

2,873,759

FAULT-RESPONSIVE SECTIONALIZING VALVE ARRANGEMENT

Vincent L. Tilli, Philadelphia, and Arthur L. Bohlinger, Havertown, Pa., assignors to General Electric Company, a corporation of New York Application May 4, 1955, Serial No. 505,976

8 Claims. (Cl. 137—266)

This invention relates to a fault-responsive sectionalizing valve arrangement for a fluid supply system and is especially applicable to that type of fluid supply system which comprises a plurality of pressure sources which are connected to share the normal loads imposed upon the system.

In the event that any portion of a fluid supply system should develop a defect, it is desirable quickly to segregate this defective portion of the system from the remainder thereof so that service may be continued over the remainder. This objective has been rather difficult to attain in those systems which are provided with two or more sources of pressurized fluid which are interconnected to share the loads which are imposed upon the system. Prior valve arrangements which have been utilized in such systems to permit the sources to supplement each other have not been entirely satisfactory in segregating any defective system portion. For example, certain of these valve arrangements have depended for their operation upon changes in the velocity at which fluid flowed through the valve. This has proven disadvantageous in that certain system defects, such as slow leaks and leaks located at a great distance from the valve, do not result in appreciable changes in the velocity of the fluid flowing through the valve. Accordingly, such prior valve arrangements have not been capable of correctly responding to such defects.

Thus, a primary object of this invention is to provide an improved valve arrangement which normally permits flow therethrough in both directions but, upon the occurrence of a defect in the portion of the system at one side thereof, operates automatically to segregate the defective portion of the system from the system portion at the other side thereof.

Another object is to provide a segregating valve arrangement of the above type which is sensitive to all system defects which result in objectionable loss of pressure including those defects which have no appreciable effect on the velocity of the fluid flowing through the valve.

Still another object is to provide a sectionalizing valve arrangement which, after closing to sectionalize the system, reopens automatically in response to a pressure build-up at either side thereof. This enables service to be automatically and rapidly restored over the previously-defective system portion once the defect is corrected, or corrects itself. It also enables such automatic restoration to take place irrespective of the side of the valve at which the defective system portion was located.

In accordance with one form of our invention, we provide a pressure-responsive regulating valve having a casing defining a chamber provided with two inlet ports and an outlet port. Means responsive to fluid pressure in the chamber is provided for closing off the outlet port when the pressure in the chamber falls below a predetermined value and for opening the outlet port when the pressure in the chamber exceeds a predetermined value. This regulating valve is connected between those two portions of the system which are intended to supplement each other, with one portion of the system connected to one inlet port and the other portion connected to the other inlet port. Check valves are provided adjacent the inlet ports for permitting fluid to flow through the inlet ports only in a direction toward the chamber. The outlet port is connected to each portion of the system by means of discharge lines which bypass the check valves adjacent the inlet ports. Each of these discharge lines also contains a check valve which permits fluid to flow therethrough only in a direction away from the outlet port.

For a better understanding of our invention, reference may be had to the accompanying drawing in which the single figure is a diagrammatic representation of a fluid supply system utilizing our invention.

The system comprises a plurality of utilization devices, such as air-blast circuit breakers designated 10, 12, 14 and 16, which are to be operated intermittently as the occasion demands by means of compressed air supplied from a plurality of separate sources, such as the two storage tanks designated T1 and T2. Connecting these storage tanks to the utilization devices are main supply lines 20 and 21 leading from the tanks, a header 23 interconnecting these main supply lines, and a series of feeder lines 24, 25, 26 and 27 interconnecting the header and the devices 10, 12, 14, and 16, respectively.

In order to maintain the air within the storage tanks at a higher pressure than the air within the remainder of the system, reducing valves 30 and 31 are provided in the main supply lines 20 and 21, respectively. Since these reducing valves may be of any conventional form, they are shown schematically only. It is to be understood that the valves are suitably adjusted to provide the desired pressure differential between the tanks and the rest of the system, that the valves open only when the system pressure falls below a predetermined level, and that flow through the valves can occur only in a direction away from the storage tanks.

To insure that both sources T1 and T2 will share the loads imposed upon the system by the normal operation of one or more of the devices 10—16, the sources T1 and T2 are interconnected by means of a normally-open high pressure tie-line 34. Thus, if for any reason, one of the reducing valves 30 or 31 should have a slightly lower setting than the other, there is no danger that the source associated with the one valve will carry the entire load to the exclusion of the other source.

Preferably each of the tanks T1 and T2 is provided with its own compressor C. Conventional pressure regulators (not shown) cause these compressors to operate whenever the tank pressure falls below a first predetermined value and also cause the compressors to cease operating when a second and higher pressure is reached.

Connected in the header 23 between feeder lines 25 and 26 is a sectionalizing valve arrangement 40 which is constructed in accordance with our invention. To facilitate an understanding of the operation of this valve arrangement 40, the portion of the system at the left hand side thereof has been designated A whereas the portion of the system at the right hand side thereof has been designated B. Normally it is desirable that the sectionalizing valve arrangement 40 should permit free communication between portions A and B so that one portion may supplement the other in case of limited inequalities in pressure. For example, if one of the breakers, say breaker 10, should be operated, the resulting slight pressure drop which occurs in portion A should be compensated for by flow through the valve arrangement 40 from portion B. Similarly, if a slight leak or other defect should develop in portion A, the falling pressure in portion A should be supplemented by flow through valve 40 from portion B. In a corresponding manner, flow in a reverse direction, i. e., from A to B, should be permitted to compensate for slight pressure drops in portion B. However, if the defect is so severe that the system loses air at a more rapid rate than the compressor C can supply it, then the sectionalizing valve 40 should close and seal off the defective portion of the system from the other portion thereof. This, of course, will prevent the whole system from being drained by the leak, and will permit the intact portion A or B of the system to remain in service.

It should be apparent from the following description that our valve arrangement 40 is capable of performing all of the above desired functions. To this end, our valve arrangement 40 comprises a conventional regulator valve 41 which comprises a casing 42 defining a chamber 43. Communicating with this chamber 43 are a par of inlet ports 44 and 45 and an outlet port 46. Fluid flow through the outlet port 46 is controlled by means of a movable valve element 47 which cooperates in a conventional manner with an annular valve seat 48 surrounding the outlet port 46. This valve element 47 is controlled by means of diaphragm 49 which extends across the top of the chamber 43. This diaphragm is a flexible member which yields in a well-known manner in response to variations in the fluid pressure within chamber 43. The valve element 47 is coupled to the diaphragm and, hence, it moves with respect to its seat 48 in response to flexure of the diaphragm. The diaphragm and the valve element are urged toward the closed position shown by means of a compression spring 50 bearing against the top side of the diaphragm. Only when the pressure within chamber 43 is built up to some predetermined value are sufficient forces established to overcome the action of spring 50 and force the diaphragm and the valve element 47 upwardly away from the seat 48 thereby permitting fluid to flow through the outlet port 46. This opening pressure can be predetermined by means of a suitable calibrating screw 51 which may be adjusted to vary the compression of the spring in a well-known manner. If the pressure within chamber 43 has built up sufficiently to drive the valve element to its open position, the valve element will remain in such open position until the pressure in the chamber falls to a predetermined value which, in the conventional regulator valve, is substantially lower than the pressure which initiated opening action.

The header 23 comprises a pair of auxiliary supply lines 55 and 56 which communicate with the inlet ports 44 and 45, respectively. Connected in the auxiliary supply lines 55 and 56 are check valves 57 and 58 which permit flow therethrough only in a direction toward the regulator valve. Leading from the outlet port 46 to the auxiliary supply lines are a pair of discharge lines 59 and 60 which respectively shunt, or bypass, the check valves 57 and 58. Connected in discharge lines 59 and 60 are check valves 61 and 62 which permit flow only in a direction away from the outlet port 46.

It should be apparent that no flow can take place through the valve 41 until the pressure in the chamber 43 has built up sufficiently to open the outlet port 46. The check valves 57 and 58 prevent bypassing of the outlet port via the supply lines 55 and 56, and the check valves 61 and 62 prevent bypassing of the exhaust port via the discharge lines 59 and 60.

However, when the pressure in chamber 43 is built up sufficiently, the diaphragm deflects upwardly to lift the valve member 47 and permit free communication between system portions A and B. More particularly, with the outlet port 46 so open, air from A may flow through supply line 55, downwardly through the chamber 43 and thence through discharge line 60 to portion B, whereas air from portion B may flow through the supply line 56, downwardly through the chamber 43 and thence through the discharge line 59 to portion A. In either case, the check valves require that the flow path extend from one of the supply lines, through the chamber and the outlet port and thence through one of the discharge lines. Opening pressure may be built up in chamber 43 either from system portion A or B. Thus, if the air pressure within either of these system portions is sufficiently high to deflect the diaphragm 49, free communication is afforded between portions A and B, as described above.

The reducing valves 30 and 31 of our system are set at a sufficiently high value that under normal conditions the regulator valve 41 remains open and affords free communication between A and B. In other words, the reducing valves 30, 31 are set to close and open at substantially higher downstream pressures than the preset closing pressure of regulator valve 41. Normal operation of one or more of the devices 10–16 does not reduce the system pressure sufficiently to cause the valve 41 to close and, as a result, under such conditions the portions A and B are capable of supplementing each other. Likewise, minor leaks do not impair the system pressure sufficiently to cause closing of the valve 41.

However, if a more serious leak or some other defect should develop which results in a continued loss of air at a rate greater than air can be supplied by compressors C, then the pressure within chamber 43 falls to a value which is insufficient to maintain valve 41 open. As a result the valve closes and segregates the defective portion of the system, either A or B, from the other unaffected portion B or A, as is desired.

To illustrate this segregation operation more specifically, assume that the leakage from the portion A of the system is so substantial a drain as to cause pressure in both portions A and B of the system to continue to fall. This causes the pressure in chamber 43 to fall to a level which is insufficient to hold the valve 41 open. As a result the valve will close to segregate the defective portion A from the intact portion B, thereby permitting at least this portion B to remain in service.

It will be apparent from the drawing that this segregating operation is not complete until the high-pressure tie-line 34 between T1 and T2 is closed off. This is the case because even with the sectionalizing valve 40 closed, an open tie-line 34 could conduct air from tank T2 into the defective portion A of the system. To preclude this undesirable condition and to protect against certain other conditions which will soon be pointed out, the tie-line 34 is provided adjacent each of the tanks with segregating valves 70 and 71. Each of these segregating valves 70 and 71 comprises a conventional diaphragm type regulator valve 73 which is of the same type as the previously described regulator valve 41. The three ports of each of the regulator valves 73 are designated 74, 75, and 76. Port 74 communicates freely with its adjacent storage tank by means of a feed line 80. Port 75 is connected to the tie-line 34 by means of a short conduit 77 containing a check valve 78, whereas port 76 is connected to the tie-line 34 by means of a duct 79 which shunts the check valve 78. The check valve 78 permits flow through conduit 77 only in a direction toward the adjacent port 75.

The regulator valves 73 are so adjusted that normal pressure in either of the storage tanks T1 and T2 maintains the valves in open position. The conduit 77, associated with each of the regulator valves 73, connects the valve chamber to the remote tank and thereby permits the regulator valve to be responsive to pressures in the remote tank, as well as to pressures in its adjacent tank. Thus, so long as the pressure in either of the tanks is maintained within normal limits, the valves 73 will remain open and permit one tank to supplement the other in the event of minor inequalities in pressure.

However, if the system should develop a major leak which results in air being lost at a rate greater than the rate at which the compressors can supply air to the system, the valves 70 and 71 respond by closing and thereby segregating one source from the other. For example, if such a major leak should develop in portion A, as assumed before, then both storage tanks would continue to lose pressure in spite of the action of the compressors. When the tank pressures fell below the setting of regulator valves 73, these valves would close and thereby block off the tie-line 34. This action combined with the previously-described closing of sectionalizing valve 40 would completely segregate defective system portion A from intact system portion B and thus, permit portion B and its corresponding tank T2 to remain in service, as is desired.

The segregating valves 70 and 71 serve still another important purpose. More particularly, if high-pressure tie-line 34 should break or develop a major leak these valves would quickly isolate this tie-line from the rest of the system and permit the two sources T1 and T2 to remain in operation. For example, if tie-line 34 should break, the tanks T1 and T2 would lose pressure until each of the regulator valves 73 closed. These valves, in closing, would isolate the defective portion of the tie-line from the tanks thereby preventing further loss of pressure through the tie-line. The check valve 78 associated with each regulator valve prevents any by-passing of the closed-off port 76 of the regulator valve during such conditions.

A particular advantage of our sectionalizing valve arrangement 40 is that it is capable of automatically and rapidly restoring service over a previously-defective system portion as soon as the defect is corrected. This permits devices in the corrected system portion to be operated long before their associated storage tank has been recharged to its normal working pressure. For example, assume that the sectionalizing valve arrangement 40 had closed in response to the occurrence of a major leak in system portion A and that this leak had drained the associated tank T1 to a pressure level far below its normal working level. Assume also that the leak is then corrected, or corrects itself, and that it is then desired quickly to operate device 12.

Our valve arrangement 40 permits such operation to be performed by compressed air supplied from tank T2 long before the pressure in tank T1 has been restored to normal. This is the case because the valve arrangement 40, after first closing, does not remain closed but reopens as soon as the pressure in the intact system portion B has been restored to normal. Compressed air then flows into the defective system A portion until the pressure in the intact portion B again falls below normal by a predetermined amount, at which time the valve 40 recloses. This cycle of operations continues repetitively and is ineffective to recharge system portion A until its defect has been corrected. Thereafter, when the valve 40 reopens, it causes pressure to be built up within the corrected system portion A, excluding the tank T1, which is then isolated from the rest of system portion A by the reducing valve 30. This build-up continues rapidly until the corrected system portion A, excluding the tank T1, is fully charged and capable of performing in the desired manner. Such build-up is completed long before the usual compressor, such as C, can reestablish normal working pressures in its tank T1. Thus, the device 12 may be operated long before the tank T1 is restored to its normal pressure, as is desired.

Since our valve arrangement 40 is symmetrical, it is immaterial which of system portions A or B should develop the defect. In either case, the valve arrangement 40 is capable of automatically and quickly restoring service to the defective portion upon correction of the defect, in the same manner as described in the preceding paragraph.

Another situation wherein this symmetry of response is important occurs when either one of the sources T1 or T2 is shut down and isolated from the remainder of the system by suitable manually-operated valves (not shown). Under such conditions, the sectionalizing valve 40 is free to open in response to a pressure build-up in the one source which is operative thereby permitting this operative source alone to be used for operating all the devices 10—16. The valve arrangement 40 is capable of performing in the desired manner irrespective of which one of the sources T1 or T2 may be shut down.

While we have shown and described a particular embodiment of our invention, it will be obvious to those skilled in the art that various changes and modifications may be made without departing from our invention in its broader aspects and we, therefore, intend in the appended claims to cover all such changes and modifications as fall within the true spirit and scope of our invention.

What we claim as new and desire to secure by Letters Patent of the United States is:

1. In a valve arrangement for sectionalizing a fluid supply system into two distinct portions in response to the occurrence of a fault in one of said portions, a regulator valve comprising a casing forming a chamber, a pair of inlet ports and an outlet port communicating with said chamber, means responsive to fluid pressure in said chamber for closing off said outlet port when the pressure in said chamber falls below a predetermined value and for opening said outlet port when the pressure in said chamber exceeds a predetermined value, a first supply line interconnecting one of said inlet ports and one portion of the system, a second supply line interconnecting the other of said inlet ports and the other portion of said system, a check valve in each of said supply lines permitting fluid to flow therethrough toward said chamber but blocking reverse flow therethrough, a first discharge line interconnecting said first supply line and said outlet port and bypassing the check valve in said first supply line, a second discharge line interconnecting said second supply line and said outlet port and bypassing the check valve in said second supply line, and a check valve in each of said discharge lines permitting flow therethrough only in a direction away from said outlet port.

2. In a valve arrangement for sectionalizing a fluid supply system into two distinct portions in response to the occurrence of a fault in one of said portions, a regulator valve located between said two system portions and comprising a casing forming a chamber, a pair of inlet ports and an outlet port communicating with said chamber, means responsive to fluid pressure in said chamber for closing off said outlet port when the pressure in said chamber falls below a predetermined value and for opening said outlet port when the pressure in said chamber exceeds a predetermined value, a first supply line interconnecting one of said inlet ports and one of said system portions, and a second supply line interconnecting the other of said inlet ports and the other of said system portions, discharge lines interconnecting said outlet port and said system portions, and check valve means in each of said lines for preventing fluid which flows through said valve arrangement from following any path other than a path which extends from one of said supply lines, through said chamber, said exhaust port, and thence through one of said discharge lines.

3. In a valve arrangement for sectionalizing a fluid supply system into two distinct portions in response to the occurrence of a fault in one of said portions, a regulator valve located between said two system portions and comprising a casing forming a chamber, a pair of inlet ports and an outlet port communicating with said chamber, means responsive to fluid pressure in said chamber for closing off said outlet port when the pressure in said chamber falls below a predetermined value and for opening said outlet port when the pressure in said chamber exceeds a predetermined value, a first supply line interconnecting one of said system portions and one of said inlet ports, and a second supply line interconnecting the other of said inlet ports and the other of said system portions, discharge lines interconnecting said system portions and said outlet port, and check valve means in each of said lines for preventing fluid from flowing through said valve arrangement by any other than one which extends through said outlet port.

4. In a fluid supply system comprising two pressure sources and a tie-line interconnecting said sources, a pressure responsive regulator valve located at each end of said tie-line closely adjacent one of said sources; each of said regulator valves comprising a casing defining a chamber, a pair of inlet ports and an outlet port communicating with said chamber, and means responsive to the fluid pressure in said chamber for closing off said outlet port when the pressure in said chamber falls below a predetermined value and for opening said outlet port when the pressure in said chamber exceeds a predetermined value; means connecting one inlet port of each of said valves to an adjacent source, conduits connecting the other inlet port of each of said valves to said tie-line, a check valve in each of said conduits permitting fluid to flow through the conduit only in a direction toward the adjacent inlet port, and a pair of ducts each connecting one of said outlet ports to said tie-line in shunt relationship with one of said check valves.

5. In a valve arrangement for sectionalizing a fluid supply system into two distinct portions in response to the occurrence of a fault in one of said portions, a regulator valve located between said two system portions and comprising a casing forming a chamber, a pair of inlet ports and an outlet port communicating with said chamber, means responsive to fluid pressure in said chamber for closing off said outlet port when the pressure in said chamber falls below a predetermined value and for opening said outlet port when the pressure in said chamber exceeds a predetermined value, a first supply line interconnecting one of said system portions and one of said inlet ports, a second supply line interconnecting the other of said system portions and the other of said inlet ports, discharge lines interconnecting said system portions and said outlet port, and check valve means in at least both of said supply lines for preventing fluid from flowing through said valve arrangement by any path other than one which extends through said outlet port.

6. In a valve arrangement for sectionalizing a fluid supply system into two distinct portions in response to the occurrence of a fault in one of said portions, a regulator valve located between said two system portions and comprising a casing forming a chamber, a pair of inlet ports and an outlet port communicating with said chamber, means responsive to fluid pressure in said chamber for closing off said outlet port when the pressure in said chamber falls below a predetermined value and for opening said outlet port when the pressure in said chamber exceeds a predetermined value, a first supply line interconnecting one of said inlet ports and one of said system portions, a second supply line interconnecting the other of said inlet ports and the other of said system portions, discharge lines interconnecting said outlet port and said system portions, and means requiring all fluid which flows through said supply lines to flow in a direction toward said chamber and all fluid which flows through said discharge lines to flow in a direction away from said chamber.

7. In a fluid supply system comprising two storage tanks, main supply lines leading therefrom, a reducing valve in each of said main supply lines permitting fluid to flow therethrough only in a direction away from said tanks, first and second system portions for distributing fluid from said main supply lines, a regulator valve comprising a casing forming a chamber, a pair of inlet ports and an outlet port communicating with said chamber, means responsive to fluid pressure in said chamber for closing off said outlet port when the pressure in said chamber falls below a predetermined first value and for opening said outlet port when said pressure exceeds a predetermined second value higher than said first value, auxiliary supply lines interconnecting said system portions and said inlet ports, discharge lines connecting said outlet port and said system portions, and means requiring all fluid which flows through said auxiliary supply lines to flow in a direction toward said chamber and all fluid which flows through said discharge lines to flow in a direction away from said chamber.

8. In a fluid supply system comprising first and second sources of high pressure fluid and a system portion interconnecting said sources and arranged to receive fluid supplied from said sources, a regulator valve located between said first source and said system portion and comprising a casing defining a chamber, a pair of inlet ports and an outlet port communicating with said chamber, means responsive to the fluid pressure in said chamber for closing off said outlet port when the pressure in said chamber falls below a predetermined value and for opening said outlet port when the pressure in said chamber exceeds a predetermined value, a first supply line interconnecting one of said inlet ports and said first source, a second supply line interconnecting the other of said inlet ports and said system portion, a check valve in said second supply line permitting flow therethrough only in a direction toward said chamber, and a discharge line interconnecting said outlet port and said second supply line and bypassing said check valve, said regulator valve acting to close said outlet port in response to the occurrence of a fault in said system portion and upon closing coacting with said check valve to segregate said faulted system portion from said source, said check valve alowing fluid to be fed from said second source to said first source through said second supply line, and means connected between said second source and said system portion for segregating said second source from said system portion in response to the occurrence of a fault in said system portion.

References Cited in the file of this patent

UNITED STATES PATENTS

| | | |
|---|---|---|
| 1,368,475 | Blakely | Feb. 15, 1921 |
| 2,547,458 | Goodner | Apr. 3, 1951 |
| 2,547,823 | Josephian | Apr. 3, 1951 |
| 2,591,641 | Troendle | Apr. 1, 1952 |

FOREIGN PATENTS

| | | |
|---|---|---|
| 482,935 | Great Britain | Apr. 7, 1938 |
| 543,894 | Great Britain | Mar. 18, 1942 |